Figure 1:
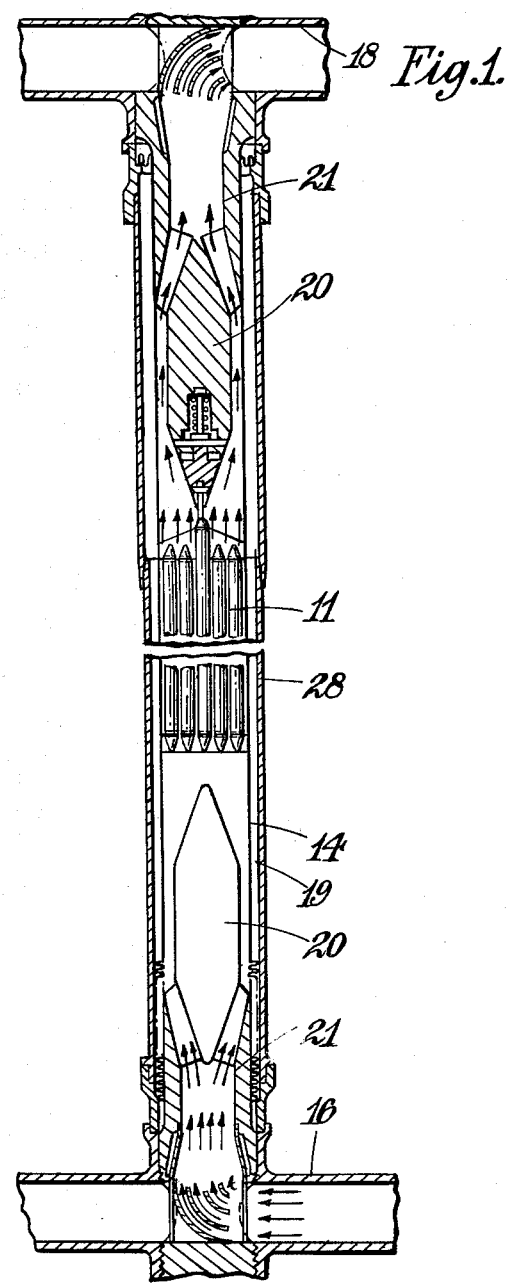

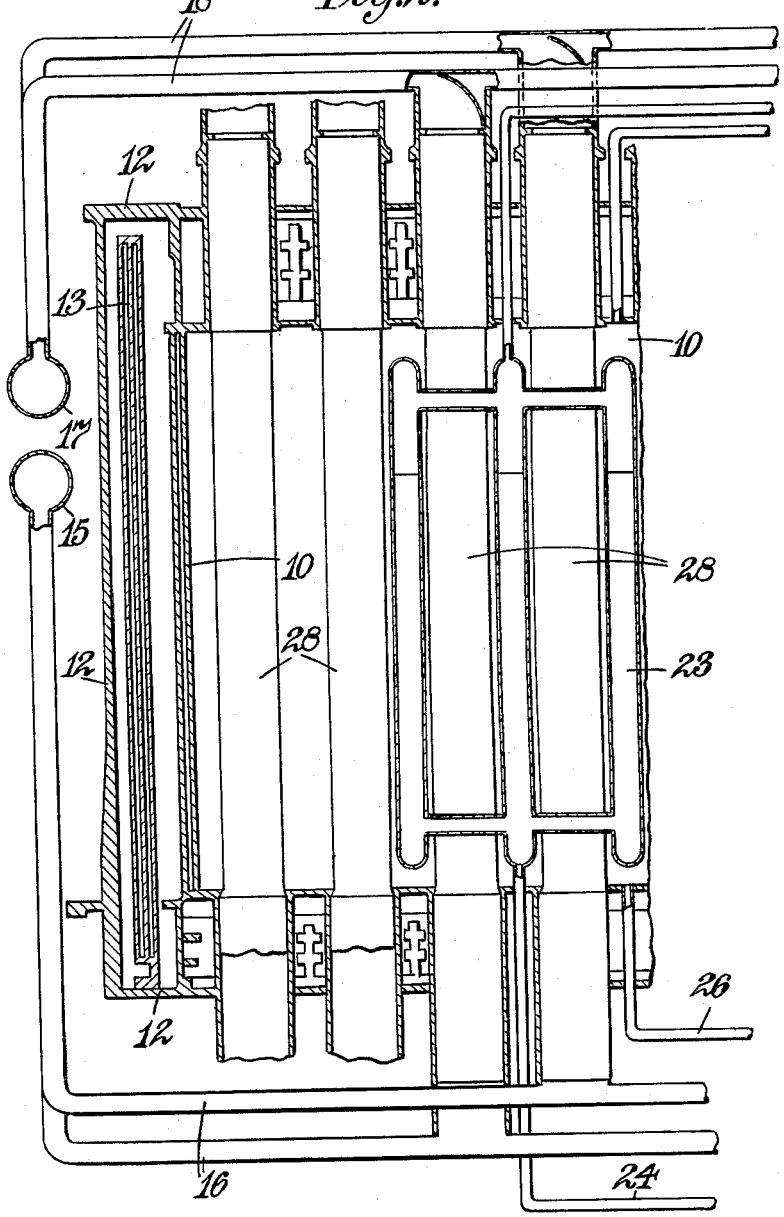

3,099,616
Patented July 30, 1963

3,099,616
STEAM COOLED REACTOR AND
FUEL CHANNEL
Stefan George Bauer, Hilton, and Norman Battle,
 Allestree, Derby, England, assignors to Rolls-Royce
 Limited, Derby, England, a company of Great Britain
Filed July 31, 1959, Ser. No. 830,787
Claims priority, application Great Britain Aug. 6, 1958
3 Claims. (Cl. 204—193.2)

This invention relates to nuclear reactors of the class hereinafter called "the class referred to" which is cooled by a high pressure fluid, for example steam, and employs another fluid, for example heavy water, in the moderator mass.

In nuclear reactors of the class referred to, it is desirable to accommodate the fuel elements in fuel channels through which the coolant flows, and to make the wall of the fuel channel tubular and of a material capable of withstanding the high temperatures experienced in operation. Stainless steel is one such material, but it is a good absorber of neutrons, and therefore it is desirable to employ as thin a stainless steel wall as possible.

It is an object of the invention to provide a construction of fuel channel which enables a material such as stainless steel to be used for the wall of the space accommodating the fuel elements but also enables the wall to be thin.

According to the present invention, a fuel channel for a nuclear reactor of the class above referred to has an inner tubular wall of thin material, such as thin stainless steel, defining a fuel element receiving space through which coolant flows, and an outer tubular wall surrounding the inner wall, the outer wall being formed from a material of substantially less neutron absorbent capacity than the material of the inner wall and being thicker than the inner wall and constructed to withstand loads due to gas under such pressure within the annular space between the walls as to support the inner wall against internal pressure loads, the gas also acting as a heat insulant for the outer wall.

The outer wall being surrounded by cool moderator liquid and being separated from the inner wall by a gas layer, is kept relatively cool and does not have to withstand the high temperature, for example 560° C. of the coolant fluid flowing through the fuel element space, and the inner wall is relieved by the pressure gas between the walls of stresses to which it would otherwise be subjected due to the pressure of the coolant flowing through it, which pressure may be 600 lbs. per square inch.

The outer tube, which may be of aluminium, is effectively the pressure barrier between the reactor coolant and the heavy water moderator.

According to a feature of the invention a fuel channel comprises a thin stainless steel tube (of the order of 15/1000" thickness) surrounded by a concentric aluminium alloy tube (of the order of 1/8" thickness) the space between being filled with an insulant gas (such as carbon dioxide or helium) at a pressure substantially equal to the pressure within the inner tube. This construction is particularly adapted for a steam-cooled heavy-water moderated nuclear reactor.

In the accompanying drawings:

FIGURE 1 is a section through one fuel element-containing channel of a nuclear reactor with provision for flow of coolant gas through the channel; and FIGURE 2 is a diagrammatic section through part of a nuclear reactor embodying the invention.

Referring to the drawings, the reactor is of the heavy water-moderated type and is steam cooled.

The heavy water moderator mass is contained within a cylindrical aluminium vessel 10 (FIGURE 2) through which extend vertically a series of spaced tubular fuel channels, such as that shown in FIGURE 1, each fuel channel accommodating a fuel element cluster 11. The longitudinal axes of the clusters 11 are vertical.

Aluminium containers 12 for light water are provided externally of the vessel 10, and steel primary shieldings 13 are accommodated in each container 12. The light water within the containers 12 acts as a reflector to deflect neutrons back into the moderator mass, and also serves to cool the primary shielding 13.

Each fuel channel for a fuel element cluster 11 comprises (FIGURE 1) a thin stainless steel alloy tubular wall 14, which opens at one end to a conduit 16 leading to a steam inlet chamber 15 and which at its other end opens into a conduit 18 leading to a steam outlet chamber 17. The steam passing through the interior of the tubular walls 14 serves to abstract heat from the fuel element clusters 11.

The inner wall 14 is supported coaxially within an outer aluminium tubular wall 28 which is spaced from the inner wall, and the annular space 19 so defined is supplied with an insulant gas, which may be $CO_2$, or helium at a pressure approximately equal to the working pressure of the coolant steam. The wall 14 is connected to the wall 28 through bellows portions which accommodate relative expansion between the walls.

The inner wall 14 being of stainless steel is suitable to withstand the effects of the high temperature coolant flowing within it, and being subjected on each surface to substantially equal gas pressures is relieved of stresses and so may be made relatively thin thereby avoiding excessive neutron absorption.

The outer wall 28 is constructed to withstand the pressures within the fuel channel and is protected against the heat generated by the fuel element clusters 11 by the insulant gas within the space 19 and by being in contact with the relatively cool moderator liquid. Also although the wall 28 will be thicker than the wall 14, it will not absorb excessive quantities of neutrons since aluminium has a low neutron absorption.

A baffle 20 is mounted within the inlet and outlet ends of each of the walls 14 adjacent a restrictor 21 so that there is no straight line flow path into or out from the space occupied by the fuel element cluster 11. The baffle 20 permits the flow of coolant steam but since neutrons travel along straight lines they will be intercepted by the baffle 20 or the restrictor 21 and are not permitted to pass into the steam inlet and outlet pipes 16, 18.

The baffle 20 may have a cylindrical body and tapering ends, as shown in FIGURE 1.

To vary the neutron flux of the reactor, the fuel channels have dispersed between them a series of control chambers 23 which are completely immersed in the heavy water moderator mass which surrounds the channels. Heavy water is fed to, or withdrawn from, the chambers 23 to vary the reactivity of the reactor.

The level of heavy water within the control chambers 23 may be controlled by means of differential valves in a supply conduit 24 which is connected to a heavy water storage tank (not shown).

A continuous circulation of heavy water moderator is maintained through the vessel 10 by a pump which draws the heavy water from a header tank and delivers the heavy water into a conduit leading to the vessel 10 from which the heavy water returns to the header tank through conduit 26.

In one example of a steam-cooled heavy water moderated reactor having fuel channels as described above and in which the space 19 is supplied with helium at steam coolant pressure, the stainless steel wall 14 has a thickness of say 15/1000". The aluminium wall 28 is thicker, say 1/8 inch thick, so as to withstand the pressure, but the losses resulting from neutron absorption will be less than would result from the use of a thicker stainless steel tube capable of withstanding the coolant steam pressure.

The thin stainless steel wall 14 carries no stress in normal operation, but it is designed to carry the full internal coolant pressure for a short period when hot, though creep would prevent it from doing so indefinitely. Alternatively it may be constructed of a ductile alloy so that when subjected to the full coolant pressure it distends without rupturing and lies against the inner wall of the aluminium tube. In either of these ways the integrity of the coolant circuit is unimpaired after failure of pressurising gas supply.

We claim:

1. In a nuclear reactor of the class in which heat is abstracted by use of a steam under high pressure, a tank containing a moderator liquid, a fuel channel extending through the tank, said fuel channel comprising an inner tubular wall of thin metal which is resistant to attack by high pressure steam, said inner tubular wall defining a fuel element receiving space and a flow path for the high pressure steam, means delivering high pressure steam to the flow path through said inner tubular wall at one end and conveying steam away from the opposite end of said inner tubular wall, said fuel channel also comprising an outer tubular wall surrounding the inner tubular wall in radially spaced relation thereto, the outer wall being formed from a metal having a substantially less neutron absorbing capacity than the metal of the inner wall and being thicker than the inner tubular wall, the space between said inner tubular wall and said outer tubular wall being sealed from said tank and from the flow path through the inner tubular wall, said space between the inner and outer tubular walls containing an inert gas at a pressure substantially equal to the pressure of said steam to support the inner tubular wall against the loads acting thereon due to the high pressure steam, said gas acting also as a heat insulant for the outer tubular wall, and the outer tubular wall being constructed to withstand the loads acting thereon due to the gas under pressure in the space between the inner and outer tubular walls.

2. A fuel channel according to claim 1, said outer tubular wall being of aluminium.

3. A fuel channel according to claim 1, said inner tubular wall being formed from thin stainless steel of the order of $15/1000''$ thickness and said outer tubular wall being of an aluminium alloy of about $1/8''$ thickness, the insulant gas supplied to the annular space between the walls being at a pressure substantially equal to the pressure of the high pressure steam flowing in the inner tubular wall.

References Cited in the file of this patent

UNITED STATES PATENTS

| 2,832,733 | Szilard | Apr. 9, 1958 |
| 2,915,446 | Liljebald | Dec. 1, 1959 |
| 2,999,059 | Treshow | Sept. 5, 1961 |

FOREIGN PATENTS

| 1,031,901 | Germany | June 12, 1958 |

OTHER REFERENCES

Proceedings of the International Conference on the Peaceful Uses of Atomic Energy, vol. III, held in Geneva Aug. 8–20, 1955. United Nations, New York, 1956, pages 176–179.

Journal of Nuclear Energy II, vol. 3, pp. 77–82, Pergamon Press Ltd., London, August 1956.